United States Patent

[11] 3,621,247

| [72] | Inventor | Basil M. Lide |
| | | Pittsburgh, Pa. |
| [21] | Appl. No. | 71,932 |
| [22] | Filed | Sept. 14, 1970 |
| [45] | Patented | Nov. 16, 1971 |
| [73] | Assignee | Westinghouse Electric Corporation |
| | | Pittsburgh, Pa. |

[54] X-RAY TIRE INSPECTION APPARATUS
6 Claims, 4 Drawing Figs.

[52] U.S. Cl. ............................................. 250/52,
73/146, 178/DIG. 5, 250/53, 250/83.3 D, 250/87,
250/89, 250/90, 250/92
[51] Int. Cl. .................................................... G03b 41/16
[50] Field of Search .......................................... 250/52, 53,
65 R, 83.3 D, 87, 89, 90, 91, 92; 73/146; 313/55;
178/DIG. 5

[56] References Cited
UNITED STATES PATENTS

| 2,301,251 | 11/1942 | Capen | 250/53 |
| 3,550,443 | 12/1970 | Sherkin | 73/146 |

*Primary Examiner*—Anthony L. Birch
*Attorneys*—F. H. Henson, E. P. Klipfel and D. F. Straitiff

ABSTRACT: Apparatus for the complete X-ray inspection of a tire is described. An X-ray tubehead with a reversible-motor-operated tube insert turnable about a vertical axis, is disposed within the tire to aim a small-focal-spot X-ray beam horizontally outward through the tire from the center of its cross section in a series of directions ranging from bead to bead, and the tire is turned by a manipulator at least a full revolution about its normal axis of rotation in each pointing direction of the beam. The manipulator and the X-ray tubehead are mounted on a common base, motor operated to turn about the same axis as that of the X-ray tube insert, to maintain registry of the tire-exiting X-ray beam with an image amplifier-TV camera assembly.

PATENTED NOV 16 1971    3,621,247

X-RAY TIRE INSPECTION APPARATUS

BACKGROUND OF THE INVENTION

1. FIELD OF THE INVENTION

The invention relates to the field of X-ray tire inspection, and more particularly to the X-ray inspection of a tire while it is removed from any wheel on which it subsequently may be used and without requiring transmission of X-rays through more than one tire wall thickness at any one time.

2. DESCRIPTION OF THE RELATED ART

While the field of X-ray inspection of tires prior to use is somewhat new, prior apparatuses heretofore proposed for performing such inspection have been characterized, for example, by lack of ability to X-ray scan the tire wall from bead to bead without simultaneously passing the X-ray beam through two wall thicknesses; lack of ability to aim the X-ray beam squarely through the bead region, which tends to obscure inspection information being sought; by necessity for complex manipulation of the tire and/or inspection apparatus; by inability to accommodate tires of different sizes; employment of several X-ray tubeheads in the same apparatus; etc.

SUMMARY OF THE INVENTION

The X-ray tire inspection apparatus of the present invention overcomes limitations of previous apparatuses, for example, by providing for directing the X-ray beam radially outward from the center of the tire cross section. This assures that only one tire wall thickness need be observed at any one time and the area observed by the beam will lie substantially the same distance from the X-ray tube at all observation angles about the tire cross section, so that the mere act of changing the observation angle does not affect image magnification.

The use of a small-focal-spot conical-beam X-ray tube insert as the source of the X-ray beam assures maximum sharpness of the image, as contrasted to panoramic-type X-ray tube inserts with necessarily larger focal-spot area.

The use of a specially constructed X-ray tubehead of relatively short, narrow, compact construction, enables insertion into a relatively wide range of tire sizes.

By providing for relative movement between the X-ray tubehead and the tire manipulator in a direction parallel to the tire sidewalls, radialwise of the tire horizontal axis, adjustment of the tubehead for different tire sizes is enabled, as well as views of the tire in the vicinity of its beads from a number of different directions, if desired, for example to enable seeing around reinforcing cable present in such beads.

By providing for horizontal adjustment of the image amplifier-TV camera assembly relative to the exterior of the tire, a degree of image magnification adjustment is provided for, as well as accommodation for different tire sizes.

By turning the manipulator and X-ray tubehead as a unit relative to the image amplified-TV camera assembly, rather than vice versa, to obtain positional synchronization between beam position and image pickup position, clearance way space required for the apparatus is minimized.

The foregoing and other features and advantages of the invention will become apparent from the following detailed description of an illustrative embodiment when taken in connection with the accompanying drawings.

DESCRIPTION OF THE PREFERRED EMBODIMENT

Figure 1:
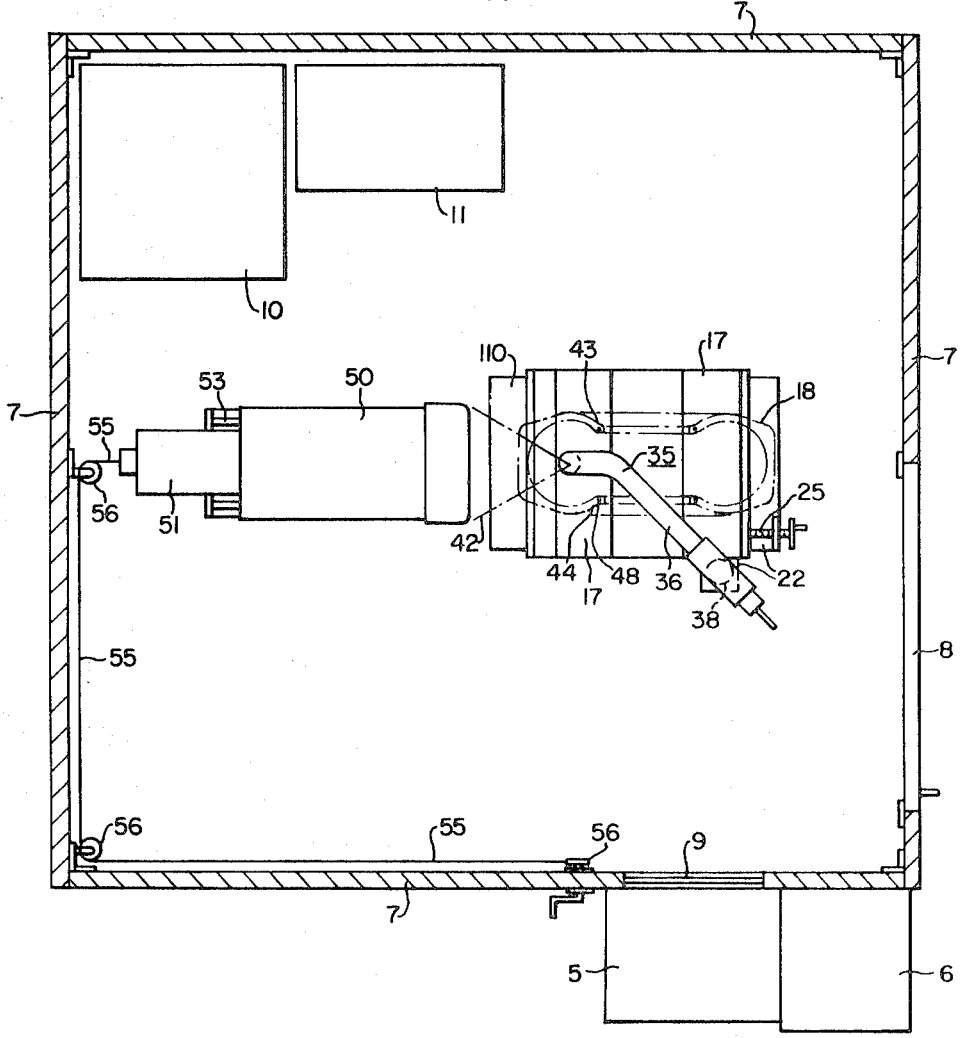
FIG. 1 is a plan view of an X-ray tire inspection installation constructed in accord with the present invention.

With the exception of an operator's station including a control console and TV monitor, 5 and 6, the tire inspection apparatus of the present invention is enclosed in a shielded room having the usual lead-lined partitions 7, a lead-lined access door 8 and a lead-glass observation window.

Within the shielded room, in addition to a water cooler and high-voltage transformer, 10 and 11, for the X-ray tube, to be described hereinafter, the apparatus comprises a tire manipulator device 15 for supporting a tire in a vertical attitude while turning it about its axis of rotation and holding its beads spread apart. For purposes of the present invention, at least with regard to the exemplified embodiment, preferably such manipulator should be capable of handling tires of different sizes, within a usual tire-type range at least, for example, and of relatively lightweight simplified construction, such as forms part of a visual tire inspection apparatus sold under the name Branick which includes a rectangular upright housing 16 having a nesting array of power-driven tire support rollers 17 at its top for supporting and turning engagement with the bottom of a tire 18, power-arm-carried idler rollers 19 at opposite sides of the tire support rollers, for spreading the beads of a tire, and side-guide idler rollers 20 cooperable with sidewalls of the tire to hold it upright while being turned by the power-driven bottom support rollers 17.

In accord with a feature of the exemplified embodiment of the invention, the manipulator housing 16 is mounted on a rotary base 22 through the medium of wheels 23 that permit horizontal movement of the tire-turning manipulator along the base in a radial direction of tire extension. A horizontal travel screw 25 provides for adjustable movement of the manipulator housing 16 on such wheels 23. The rotary base is mounted on a short floor-mounted pedestal shaft 26 through the medium of a sleeve 27 and a pair of ball bearing assemblies 28 and 29 at separated locations on such shaft. An electric motor and gear reducer mechanism 30 is operatively connected to the base 22 via a chain 31 and sprockets 32 and 33. The travel screw 25 for adjusting position of the manipulator 15 along the base 22 also may be operated by a motor (not shown) if desired for sake of convenience.

In accord with a prime feature of the present invention, a small, compact, X-ray tubehead 35 is supported within the tire annulus on the bent end of a horizontal support arm 36 which extends forwardly and sidewardly outward from the center of the tire to a rigid fixed support column 38 anchored at its bottom to the rotary base 22 on which the manipulator 15 also rests.

The novel tubehead 35, to be described in detail hereinafter, comprises a relatively short (6 inches, for example), generally cylindrical, small diameter (2 ⅛ inches, for example) X-ray tube insert 40 of the water-cooled, metal-ceramic, industrial type having a small focal spot (0.5 mm., for example) such as used in Model MX10–05 X-RAY TUBE HEAD sold by Magnaflux Corporation to operate at 100 kv., but operated by providing bias to its cathode cup (not shown) to produce a 40° X-ray beam rather than the usual 24° beam, to fill the image system screen. In accord with a feature of the invention, the small cylindrical tube insert 40 is arranged to extend vertically within the tire annulus, with its beam exit window 41 pointing horizontally in alignment with a horizontal midplane of the tire undergoing inspection. The insert 40, as the source of the X-ray beam 42, FIG. 1, is adapted to be scanned internally of the tire annulus from one bead 43 to the other 44 by rotary movement about its vertical axis 45 between rotary limit positions in opposite directions. In each successive rotary position of the tube insert 40 required to illuminate the tire cross section by the X-ray beam from one tire bead to the other, the manipulator will turn the tire 18 about its central axis at least one complete revolution, so that ultimately the entire tire will be so illuminated. By locating the axis 45 of the X-ray tube insert substantially at the center of the tire cross section, which can be brought about during setup for a given size tire by adjustment of the horizontal travel screw 25 at the bottom of the manipulator 15, the exit window 41 for the X-ray beam 42 will be maintained substantially the same distance from the tire interior in all radial positions of such beam, and will strike the inner tire surfaces substantially perpendicularly in all such positions. If desired, the scanning technique can be altered from the standard radial pattern to one extending parallel to the sidewalls of the tire by horizontal movement of the tire manipulator as brought about by turning the horizontal travel screw 25 affiliated with the rotary base 22. Such sidewall-parallel movement of the tire past the X-ray beam may find advantage when observing the areas in the vicinity of the tire beads 43 and 44, for example, where a reinforcing cable 48 embedded in the tire beads may otherwise obscure the X-ray view of outer portions of the bead.

Figure 2:
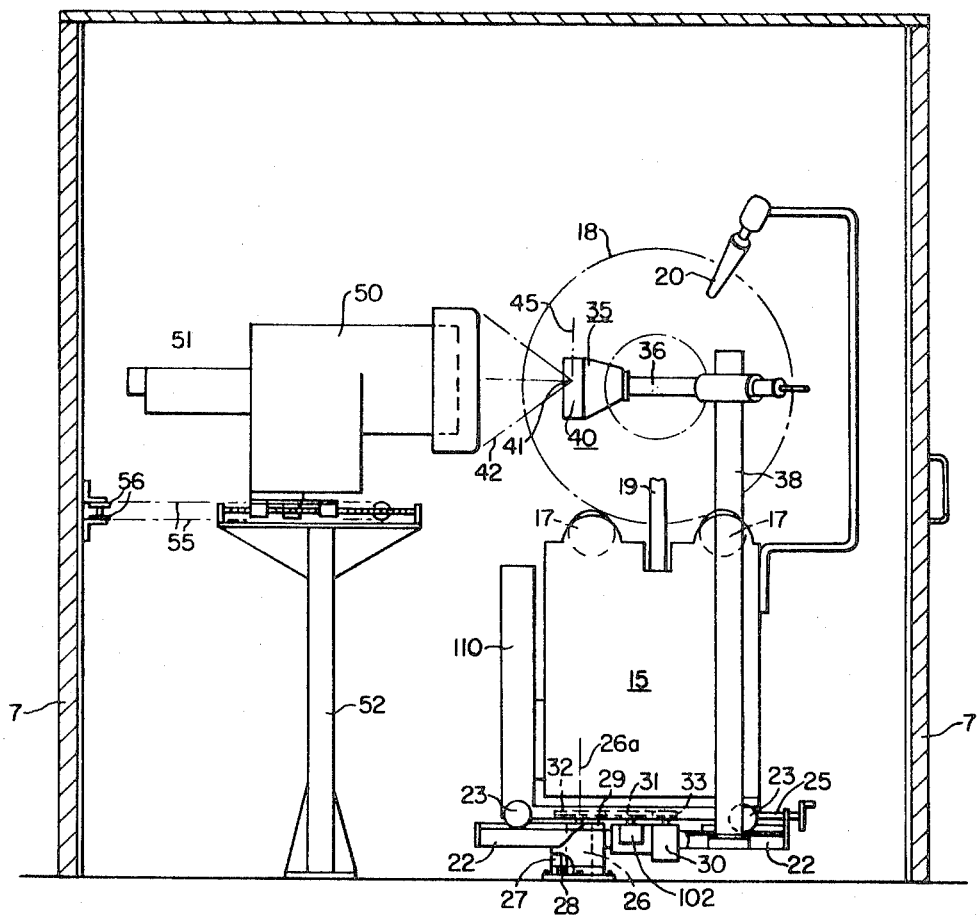
FIG. 2 is a front elevation view of novel tire inspection apparatus embodied in the installation depicted in FIG. 1, as viewed in the direction of arrow II therein.

To pick up the latent X-ray image of the tire section illuminated by the X-ray beam, an image amplifier tube 50 is positioned with its input screen (not shown) in alignment with the X-ray beam exiting from the tire. A TV camera 51 is mounted on the image amplifier tube housing to observe its output screen (not shown) and transmit X-ray tire image information to the TV monitor 6 at the operator's station outside the inspection room. The image amplifier tube 50 and TV camera 51 assembly is mounted on a fixed pedestal 52, FIG. 2, through the medium of guide and sleeve means 53 that permits proximitywise adjustment of such assembly relative to the exterior of the tire, such as for the purpose of intercepting the X-ray beam at a diameter commensurate with the size of the image tube input screen, image magnification, initial setup condition adjustment, etc. Such adjustment may be effected manually from the operator's station outside the inspection room via such as the cable 55, pulley 56, and handcrank 57 arrangement shown in FIGS. 1 and 2, or motor.

To maintain alignment of the image amplifier tube and TV camera assembly 50, 51 with the X-ray beam 42 in all of its horizontally projecting radial positions about the axis 45 of the X-ray tube insert 40 brought about by rotary movement of such insert, the rotary base 22 is turned by the motor 30 about the axis 26a of the pedestal shaft 26, to carry the manipulator 15, the tire 18, and the X-ray tubehead 35 with it around such axis in synchronism with turning of such tube insert. The axis 26a about which the tire is turned together with the manipulator and tubehead, is aligned with the axis 45 about which the X-ray beam turns to maintain the same distance between X-ray tube insert and image amplifier tube in all such synchronized radial positions.

Figure 3:
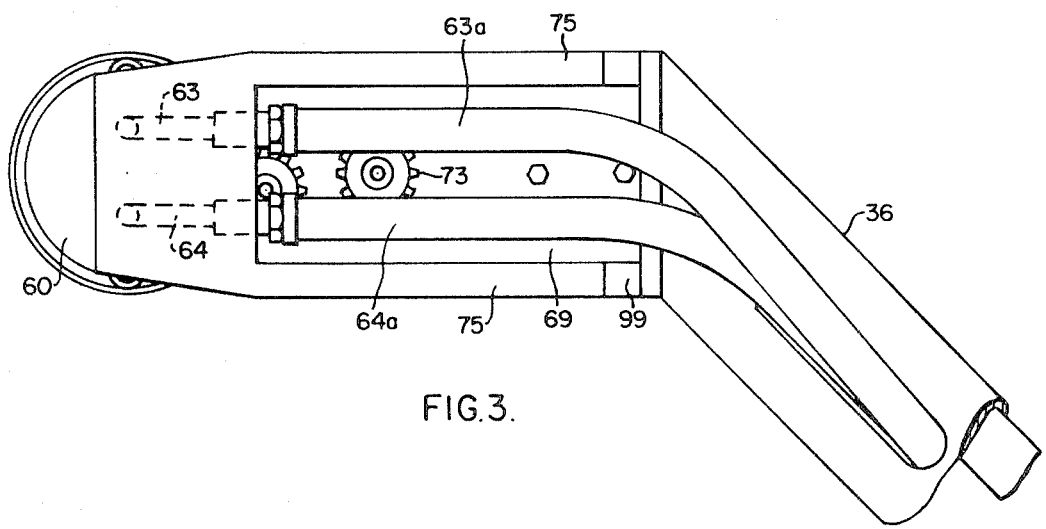
FIG. 3 is a top view in outline of a novel rotary beam X-ray tubehead employed in the apparatus of FIGS. 1 and 2.
Figure 4:
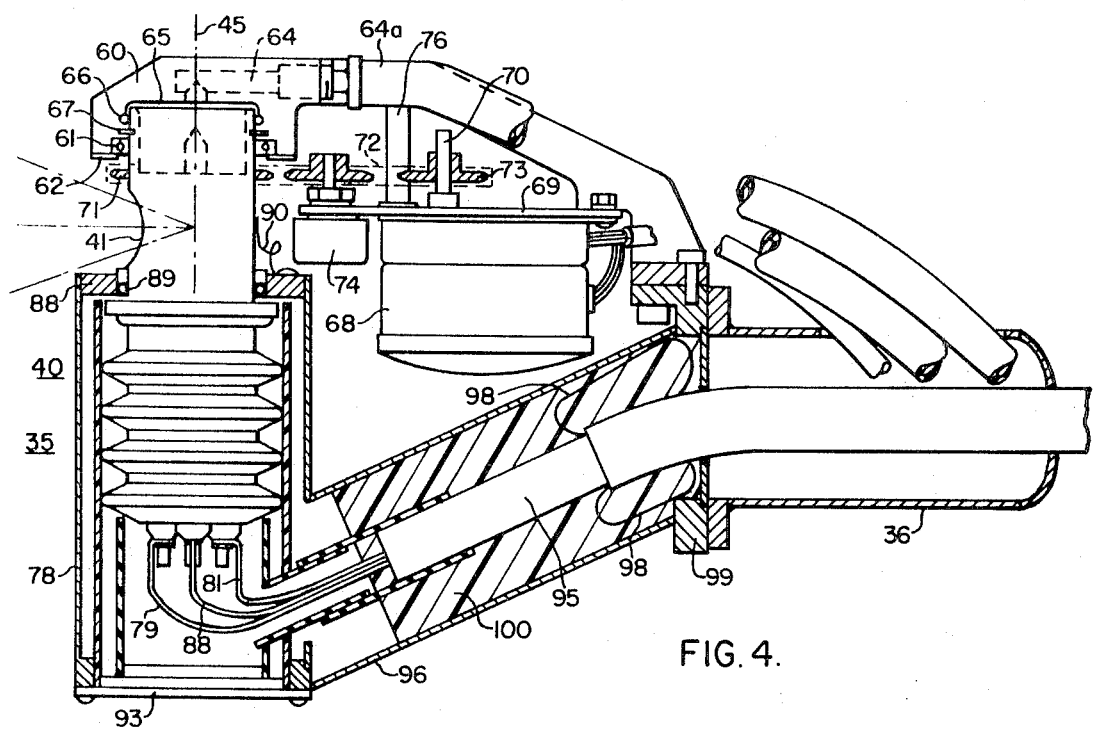
FIG. 4 is a front elevation view, partly in outline and partly in section, of the novel rotary beam X-ray tubehead shown in outline in FIG. 3.

Referring to FIGS. 3 and 4, the novel X-ray tubehead 35 as presently constructed to provide for the aforedescribed rotary movement of the X-ray tube insert 40 about a vertical axis 45 comprises a rotary-supporting cooling head 60 which embraces the upper metallic end of the insert in which the beam exit window 41 is located. A ball bearing assembly 61 is retained in the head 60 by an annular retaining plate 62 for antifriction rotary support of such upper insert end. Inlet and outlet cooling water passages 63 and 64, only one of which is shown in FIG. 4, communicate with a narrow cooling chamber 65 within the head 60 in exposure to the uppermost end of insert 40. Flexible cooling water hoses 63a and 64a are connected by suitable fittings to the cooling water passages 63 and 64 to circulate cooling water through cooling chamber 65 in and to and from the water cooler 10 of FIG. 1 via the interior of the tubehead support arm 36, etc. An O-ring seal 66 held by a retainer ring 67 prevents escape of cooling water from chamber 65. A small motor 68, secured at its upper end to a horizontally extending mounting plate 69, is disposed at an inner side of the tube insert 40 with the output shaft 70 of the motor extending upwardly parallel to the rotary axis 45 of insert 40. The motor shaft 70 is coupled to the insert 40 through the medium of an annular sprocket 71 disposed around the periphery of insert 40 adjacent to the lower end of the rotary-supporting cooling head 60, a chain 72, and a sprocket wheel 73 secured to such motor shaft. A potentiometer 74 driven by chain 72 serves to provide positional information with respect to rotary position of the X-ray beam exit window. A rigid support member 75 formed integrally with the head 60 extends downwardly and rearwardly therefrom across the top and to the rear of the motor 68 to provide support for the mounting plate 69 removably secured thereto via machine screw and nut assemblies. A standoff tube 76 extends between mounting plate 69 and member 75 to provide rigidity to the motor drive assembly.

The lower, convoluted, ceramic, high-voltage lead end of the X-ray tube insert 40 is encased in an oil-filled metal cylinder housing 78 which extends from the lowermost region of the metallic upper end of insert 40 downwardly a short distance below a high voltage and filament leads 79, 80, 81 for the insert. Insulating sleeves 85 and 86, arranged coaxially within housing 78, encircle the ceramic portion of insert 40 and the leads 79, 80, and 81. An annular cover member 88 at the top of the housing 78 in cooperation with a rotary sealing means 89 serves to retain insulating oil within the housing 78 at its top while permitting rotary movement of insert 40 relative to such housing. A coiled ground strap 90 extends between annular cover member 88 and the metal portion of insert 40 to complete a high-voltage circuit through such insert in accord with the particular industrial type of insert being employed. The lower end of the metal housing 78 is closed by a removable, gasketed cover plate 93. The one high-voltage lead and the two filament leads 79, 80 and 81 extend upwardly and rearwardly to a high-voltage cable 95 disposed in a metallic tube member 96 joined to housing 78. The braided ground portion of the high-voltage cable 95 is stripped back in several places 98 and soldered to a support flange 99 located at the junction of the upper end of tube member 96 and the lowermost end of support member 75. Flange 99 provides for mounting the tubehead assembly 35 on a mating flange on the end of tubehead support arm 36. The high voltage cable 95 is retained in place centrally within tubular member 96 by epoxy material 100. Sufficient slack is provided the leads 79, 80 and 81 within housing 78 to permit the back-and-forth rotary movement of X-ray tube insert 40 within such housing.

In operation of the inspection apparatus, the aforedescribed rotation of the manipulator and tubehead supporting base 22 by the motor 30 in synchronism with rotary movement of the X-ray tube insert 40 by the motor 68 can be obtained simply by use of synchronous motors and suitable choice of output drive ratios, or by use of other type motors regulated in accord with positional information obtained from the potentiometer 74 in tubehead 35 and a similar potentiometer 102 affiliated with the rotary drive chain 31 for such base together with suitable servocontrol circuit means.

To bring the horizontal center plane of different diameter tires into vertical alignment with the horizontal axis of the X-ray beam emergence window 41 in the rotary tubehead insert 40, hydraulic means 110 for lifting the manipulator 15 is employed.

What is claimed as new and desired to be secured by Letters Patent is:

1. X-ray tire inspection apparatus comprising,
    manipulator means for turning a tire about a horizontal axis at its center,
    an X-ray tubehead having motor-operated rotary X-ray beam-producing means therein turnable about a beam scan axis, constructed and arranged for disposition within the annulus of said tire to scan the interior thereof with an X-ray beam from bead to bead,
    tubehead support means for extension between the tire beads,
    X-ray image pickup means for response to the X-ray beam emerging from said tire, and
    power-operated means for effecting relative rotary movement between said manipulator means and said image pickup means in synchronism with turning of said X-ray beam-producing means to maintain alignment of said pickup means with said X-ray beam.

2. The X-ray tire inspection apparatus of claim 1, wherein, said power-operated means comprises a rotary base supporting said manipulator means and said tubehead support means, and motorized drive means for turning said base relative to said X-ray image pickup means about a base support axis.

3. The X-ray tire inspection apparatus of claim 2, wherein, said base support axis is aligned with said beam scan axis.

4. The X-ray tire inspection apparatus of claim 1, wherein, said manipulator means effects such turning of a tire by power-driven rollers in frictional engagement with the tire tread in the vicinity of the bottom of the tire, and, said apparatus further comprises adjusting means for effecting relative adjustment between said tubehead and said manipulator to compensate for different tire sizes.

5. The X-ray tire inspection apparatus of claim 1, wherein, said motor-operated rotary X-ray beam-producing means is in the form of an X-ray tube insert mounted for rotary movement about said beam scan axis within said tubehead, and said tubehead contains motor means for effecting such rotary movement of said X-ray tube insert.

6. An X-ray tubehead comprising,
a generally cylindrical small-focal-spot water-cooled X-ray tube insert having a beam emergence portion with a circular radial exit window at one location in its periphery, and an energization input portion,
a rotary-supporting cooling head embracing the end of said beam emergence portion, said cooling head having cooling water inlet and outlet passages in exposure to such end of said beam emergence portion,
a dynamic rotary seal interposed between said cooling head and said beam emergence portion to retain cooling water admitted to the end thereof,
antifriction-bearing means between said cooling head and said beam emergence portion,
an oil-filled housing encasing said energization input portion of said insert,
dynamic sealing means between said housing and energization input portion to retain insulating oil therein,
electrical leads connected within said housing to said energization input portion, said leads being so constructed and arranged as to permit reversible rotary movement of said insert,
electric motor means operatively connected to said insert for effecting such reversible rotary movement,
rigid support means interconnecting said cooling head, said housing, said motor, and said leads at one side of said insert in a compact assembly of a thickness depth substantially no greater than that of said housing and said cooling head, and
mounting means affiliated with said rigid support means.

* * * * *

Notice of Adverse Decision in Interference

In Interference No. 97,973 involving Patent No. 3,621,247, B. M. Lide, X-RAY TIRE INSPECTION APPARATUS, final judgment adverse to the patentee was rendered Feb. 14, 1974, as to claims 1, 4 and 5.

[*Official Gazette May 21, 1974.*]